(12) United States Patent
Geniesse

(10) Patent No.: US 10,223,669 B2
(45) Date of Patent: *Mar. 5, 2019

(54) METHODS AND SYSTEMS FOR ORGANIZING PRODUCTS FOR PURCHASE BASED ON TANGENTIAL INFORMATION

(71) Applicant: Tom Geniesse, New York, NY (US)

(72) Inventor: Tom Geniesse, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,042

(22) Filed: Apr. 27, 2018

(65) Prior Publication Data

US 2018/0349836 A1  Dec. 6, 2018

Related U.S. Application Data

(60) Division of application No. 14/708,960, filed on May 11, 2015, which is a continuation of application No. 12/150,600, filed on Apr. 29, 2008, now Pat. No. 9,031,865.

(60) Provisional application No. 60/914,743, filed on Apr. 29, 2007.

(51) Int. Cl.
```
G06Q 30/00    (2012.01)
G06F 17/30    (2006.01)
G06Q 10/08    (2012.01)
A47F 7/28     (2006.01)
G06Q 30/06    (2012.01)
```

(52) U.S. Cl.
CPC .......... *G06Q 10/087* (2013.01); *A47F 7/28* (2013.01); *G06Q 30/0643* (2013.01)

(58) Field of Classification Search
CPC .................................................. G06Q 10/087
See application file for complete search history.

(56) References Cited

U.S. PATENT DOCUMENTS

| | | |
|---|---|---|
| 9,031,865 B1 | 5/2015 | Geniesse |
| 2002/0099560 A1 | 7/2002 | Enfield |
| 2002/0112237 A1 | 8/2002 | Kelts |
| 2003/0221159 A1 | 11/2003 | Kaprosy |
| 2004/0181445 A1 | 9/2004 | Koisky |
| 2005/0279579 A1 | 12/2005 | Milk |
| 2006/0179055 A1 | 8/2006 | Grinsfelder |
| 2007/0203787 A1 | 8/2007 | Keller-Go |
| 2009/0210321 A1 | 8/2009 | Rapp |
| 2015/0242807 A1 | 8/2015 | Geniesse |

OTHER PUBLICATIONS

Tastings Uhttp://www.tastings.com/Internet Archive (Mar. 1, 2005)—http://web.archive.org/web/20050301090712/www.tastings.com/.*

(Continued)

*Primary Examiner* — Kathleen Palavecino
(74) *Attorney, Agent, or Firm* — Charles A. Rattner

(57) ABSTRACT

Methods and systems for providing an information-conveying layout based on tangential categories of products for sale in a retail location are applicable to any product for which there are multiple complex criteria for determining an appropriate selection. By providing customers with an intuitive and systematic approach to selecting a desired product, such as wine, the present disclosure provides customers the rare satisfaction of quickly making a precise and intelligent decision based on informed choice, rather than choosing only based on a direct category or relying on the suggestions of a salesperson.

9 Claims, 8 Drawing Sheets

(56) References Cited

OTHER PUBLICATIONS

Tastings http://www.tastings.com Internet Archive (Mar. 1, 2005)—http://web.archive.org/web/20050301090712/www.tastings.com/.
Classic Wines http://www.classicwines.com Internet Archive (Feb. 2, 2007)—http://web.archive.org/web/20070202003837/http://classicwines.com/.

\* cited by examiner

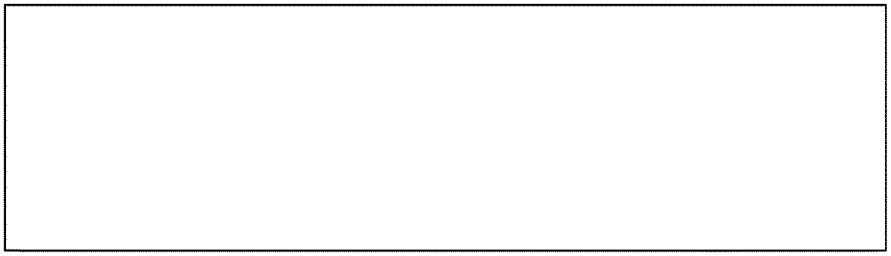

PATRICIA GREEN CELLARS  $34.00 750ml

PINOT NOIR "FOUR WINDS" 2005
PINOT NOIR

USA > OREGON >> WILLAMETTE VALLEY >>> YAMHILL COUNTY

RED, DRY, MEDIUM-BODIED, EARTHY, CRISP

YOU'VE HEARD IT BEFORE AND IT'S JUST TRUE, PINOT NOIR LOVES FOOD. BIG ENOUGH TO MATCH STRONG SEAFOOD, OR TRY A LIGHTER MEAT HOPEFULLY WITH A MUSHROOM OR TWO. EXPERIMENT!

EYES: RED
NOSE: MEDIUM INTENSITY, YOUTHFUL, LICORICE, BLACK FRUITS, EARTHY

MOUTH: MEDIUM BODIED, DRY, MEDIUM-HIGH ACIDITY, AVERAGE TANNIN, MODERATE-HIGH INTENSITY, BRAMBLY, BLACKBERRY, BARNYARD, MEDIUM-LONG FINISH

PARKER: N/A
WINE SPECTATOR: N/A
WSJOURNAL: N/A
NYTIMES: N/A
BOTTLEROCKET INDEX: 4

ONLY 375 CASES PRODUCED. LUCKY US TO SECURE AN ALLOCATION. PATTI GREEN WAS THE WINEMAKER FOR TORII MOR AND HAS BEEN A SERIOUS (AND SERIOUSLY FUN) PLAYER IN THE OREGON WINE SCENE FROM THE EARLY DAYS. GREAT WINE...FUN PEOPLE...WHAT ELSE DO YOU NEED TO KNOW? GONE SOON.

PATRICIA GREEN CELLARS  $34.00 750ml

PINOT NOIR "FOUR WINDS" 2005
PINOT NOIR

USA > OREGON >> WILLAMETTE VALLEY >>> YAMHILL COUNTY

RED, DRY, MEDIUM-BODIED, EARTHY, CRISP

YOU'VE HEARD IT BEFORE AND IT'S JUST TRUE, PINOT NOIR LOVES FOOD. BIG ENOUGH TO MATCH STRONG SEAFOOD, OR TRY A LIGHTER MEAT HOPEFULLY WITH A MUSHROOM OR TWO. EXPERIMENT!

| | | |
|---|---|---|
| EYES: | RED | PARKER: N/A |
| NOSE: | MEDIUM INTENSITY, YOUTHFUL, LICORICE, BLACK FRUITS, EARTHY | WINE SPECTATOR: N/A |
| MOUTH: | MEDIUM BODIED, DRY, MEDIUM-HIGH ACIDITY, AVERAGE TANNIN, MODERATE-HIGH INTENSITY, BRAMBLY, BLACKBERRY, BARNYARD, MEDIUM-LONG FINISH | WSJOURNAL: N/A NYTIME: N/A BOTTLEROCKET INDEX: 4 |

ONLY 375 CASES PRODUCED. LUCKY US TO SECURE AN ALLOCATION. PATTI GREEN WAS THE WINEMAKER FOR TORII MOR AND HAS BEEN A SERIOUS (AND SERIOUSLY FUN) PLAYER IN THE OREGON WINE SCENE FROM THE EARLY DAYS. GREAT WINE...FUN PEOPLE...WHAT ELSE DO YOU NEED TO KNOW? GONE SOON.

*

NOTES:

HATE IT ☐   NOT MY THING ☐   OKAY ☐   LIKED IT ☐   LOVED IT ☐

FIG. 4

METHODS AND SYSTEMS FOR ORGANIZING PRODUCTS FOR PURCHASE BASED ON TANGENTIAL INFORMATION

CROSS-REFERENCE TO RELATED APPLICATIONS

This application claims priority under 35 U.S.C. § 120 as a divisional of U.S. patent application Ser. No. 14/708,960 entitled "Methods and Systems for Organizing Products for Purchase Based on Tangential Information" filed in the name of Tom Geniesse on May 11, 2015, which, in turn, is a continuation of U.S. Pat. No. 9,031,865 entitled "Methods and Systems for Organizing Products for Purchase Based on Tangential Information" issued in the name of Tom Geniesse on May 12, 2015, which, in turn, claims priority under 35 U.S.C. § 119 to U.S. Provisional Patent Application Ser. No. 60/914,743 entitled "Methods and Systems for Processing Information Related to Beverages" filed in the name of Tom Geniesse on Apr. 29, 2007, the entirety of each of which are incorporated herein by reference.

FIELD OF THE DISCLOSURE

The present disclosure relates generally to methods and systems for processing information and more particularly to methods and systems for processing information relating to retail products.

BACKGROUND OF THE DISCLOSURE

Consumers are faced with multitudes of decisions in making purchases, many of which must be made without appropriate, readily available information.

Wine, for example, is a simple pleasure to drink. Buying wine is a different matter. Wine is a big, complicated, confusing subject for most people. There are thousands of grape varieties, tens of thousands of producers and hundreds of thousands of brand varieties to choose from. Furthermore, the same grape tastes different depending on where it was grown, how it was grown, how it was made into wine, which vintage it hails from, and how old it is today.

This complexity provides a lifelong learning adventure for those who chose to dedicate themselves to the subject. However, most people feel uninformed, and for them making an intelligent buying decision for wine is nearly impossible on their own.

Traditionally, wine stores have organized wines by one direct category, such as country of origin (e.g. France, Italy, Spain). A few have organized their offerings by other, directly-related categories (e.g. Chardonnay, Cabernet Sauvignon, and Merlot varieties of wine). However, unless the consumer could find a knowledgeable salesperson, he or she would have to guess about the suitability of a given wine based on such direct information.

BEST CELLARS, founded in 1996, took an important step forward to a more consumer-centric approach by organizing the store according to flavor profile using eight key words: Fizzy, Fresh, Soft, Luscious, Juicy, Smooth, Big, Sweet to describe the taste of the wine. At BEST CELLARS, a consumer can choose a wine based on a direct classification of the wine itself, such as how it tastes, which provides a somewhat more user-friendly and intuitive arrangement than the traditional model. While this additional direct categorization is helpful, it proves limited in scope when placed into practice.

The present applicant has recognized the need for and developed innovative methods and systems to lead consumers through a unique decision-making process allowing them to make informed and personally appropriate buying decisions.

SUMMARY OF THE DISCLOSURE

The applicant has addressed the challenge of how can one organize a large number of complex products and present them to an uninformed consumer in a way that makes his or her decision-making not only possible, but efficient, informed and enjoyable.

The present disclosure provides a comprehensive and systematic approach to the retail sale of, for example, wine utilizing a physical, electronic and conceptual construct that leads a consumer through a hierarchical decision-making process based on tangentially-related (rather than only directly-related) categories, which correspond to the varieties of a product that are suitable to the consumer's preferences. This results in a fact-based, personalized, intelligent purchasing decision by the consumer without need for further guidance by sales personnel or the like.

DESCRIPTION OF THE DRAWING FIGURES

These and other objects, features and advantages of the disclosure will be apparent from a consideration of the following Detailed Description below considered in conjunction with the accompanying Figures, of which:

FIG. 3 is a display of information available to a consumer in association with a beverage product;

FIG. 4 is another display of information available to a consumer in association with a beverage product;

DETAILED DESCRIPTION OF THE VARIOUS EMBODIMENTS

Figure 1:
FIG. 1 is a pictorial representation of a retail store configured in accordance with an embodiment of the disclosure.

In accordance with the present disclosure, there are provided herein methods and systems for organizing consumer products in a physical structure and providing information in different formats relative to the products, the organizational structure and information useful to a consumer in making a purchasing decision.

As a good example of a complex product category, wine has been sold in virtually the same way for hundreds of years. BERRY BROTHERS AND RUDD in London, England was founded in 1698 and hasn't changed the way it sells since, except to now offer wine online. The present disclosure provides an integrated, unique and proprietary approach providing valuable utility to the consumer. By systematically organizing the wine buying experience according to common, known consumer needs, and engineering organizational principals designed to lead buyers to appropriate, targeted decision sets, consumers can easily navigate the complex world of wine and make highly effective and personal decisions. This disclosure is new, valuable, potent and much more effective than any model heretofore presented.

The system addresses a number of critical elements: selection, organization, information, technology, and architecture.

The "paradox" of choice is that consumers can become paralyzed by too much choice. In one embodiment of the disclosure, a retail wine store is limited to displaying an inventory of a number of wines, such as 365, which is enough choice to provide an avid consumer with a different bottle of wine every night for an entire year. It will be understood that the disclosure is not limited to 365 products, but rather is guided by the concept of providing a significant but not overwhelming number of choices. Within this tightly edited selection are wines from every major wine growing region, every major grape variety and style, and price points meaningful to the consumer.

The present disclosure includes methods and systems that provide consumers two ways to make decisions: an old-fashioned display in combination with a new and improved system. Along one wall, all 365 wines are organized in a traditional wine store fashion, by region, which is familiar to long-time consumers but less valuable for making informed decisions.

The new system overcomes the complexity of wine and guides consumers to good decisions. In brief, consumers do not know wine, but they are intelligent about their lives. One may not know anything about Italian wines, but one would know that one is planning to cook salmon for dinner tonight. This tangential information is suitable for making an informed wine purchasing decision. As another example, one might not know exactly what wine to buy one's boss as a gift, but one would know how much he or she wants to spend on the boss and whether or not the boss cares about wine, etc.

Therefore, in the described embodiment, the 365 wines are organized according to a predictable set of top-level tangential categories based upon tangential criteria for which the vast majority of consumers use wine. These categories may then be split into related sub-categories. For each sub-category, a manageable set of choices is then presented along with detailed information on each product in the sub-category.

For example, a consumer may be ordering take-out food for dinner. Therefore one of the selected tangential categories of wine may be "Take-Out." Sub-categories for "Take Out" may include those wines that go well with "Chinese," "Japanese," "Thai" or "Indian" cuisines. One embodiment of the disclosure includes a retail store, described in further detail herein, including a physical structure called an island to facilitate this process. Each island may be dedicated to a single category, while each side of an island may be dedicated to one of the associated subcategories. Slots in each side may, in turn, be dedicated to one of the associated products and include the product as well as additional direct information regarding the product. Other forms of product displays, including all known traditional types of displays may readily be used in place of or in conjunction with the islands described herein.

According to the foregoing, an area of interest, "Take Out" provides the consumer with a sub-set of, say, twenty wines from the overall offering of 365. Drilling down further, each sub-category consists of, for example, five wines.

Figure 8:
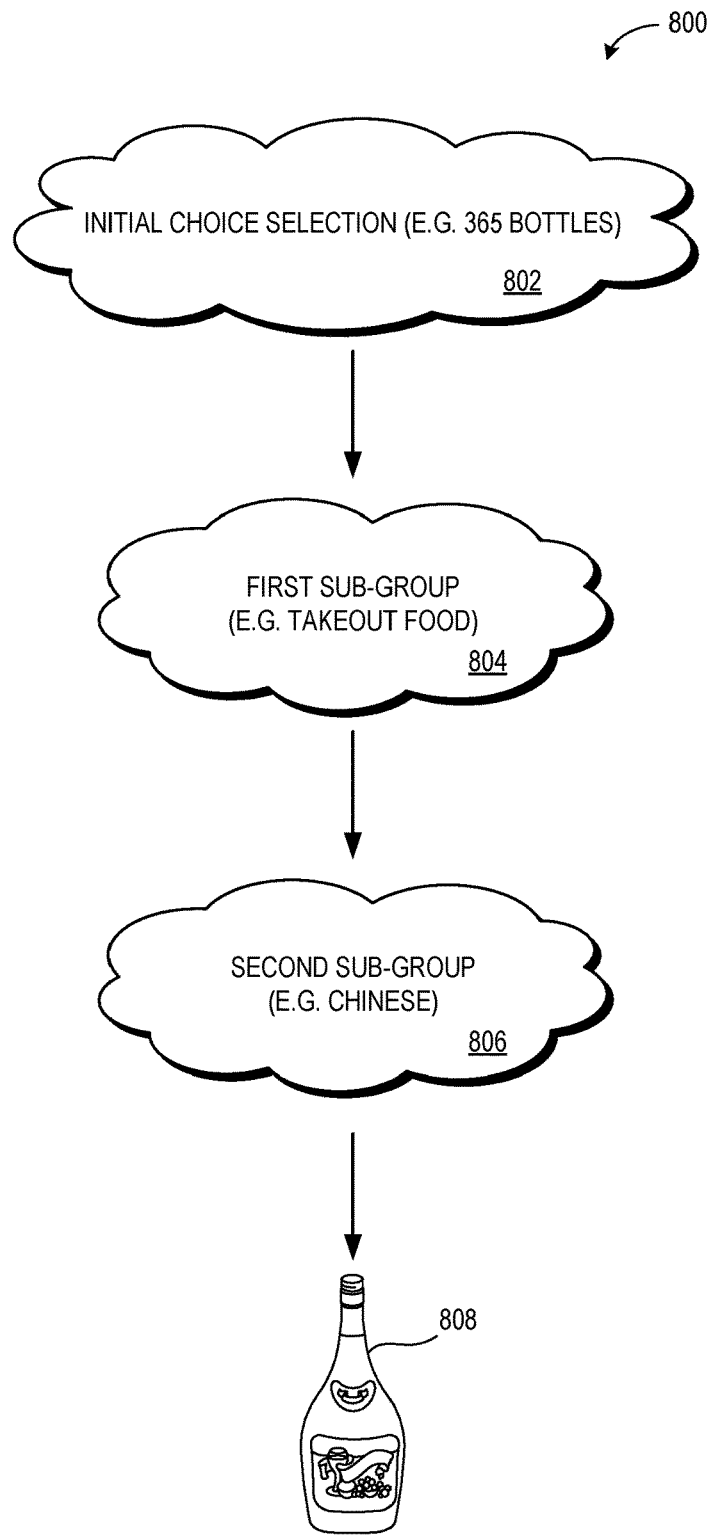
FIG. 8 is a flow chart illustrating a selection process in accordance with the present disclosure.

The following exemplary lists illustrate a general organizational principle of the disclosure involving exemplary tangentially-related categories (in caps) and corresponding exemplary sub-categories (after dashes) to the product being sold (in this case, wine):

MEAT:
Beef—Lamb—Pork—Game
POULTRY:
Chicken—Duck—Game
SEAFOOD:
Light Fish—Dark Fish—Fatty Fish—Shellfish
TREATS:
Dessert—Mild Cheese—Stinky Cheese—Chocolate
GIFTS:
For Someone You Barely Know (<$10)—An Old Friend ($10-$20)—Third Date ($20-$30)—The Boss ($30 and Up)
Market Fresh (Based on Local Farmers Market Produce, for Example):
Asparagus—Spring Lamb—Wild Greens—Fiddleheads
Explore:
Odd Grapes—Globe Trot—Guest Importer—Featured Region
Headlines (Current News on Wine from Rotating Selection of National Publications):
New York Times®—Wall Street Journal®—Food & Wine®—Wine Spectator®
GREEN:
Organic—Biodynamic—Local
CRITICS PICKS:
Staff Picks—Wine Spectator®—Wine Enthusiast®—Wine Advocate®
RECIPES (Ever-Changing Recipes from Major Publications):
Everyday Food—The Minimalist®—Food & Wine®—Gourmet Magazine®
TAKE OUT:
Chinese—Indian—Japanese—Thai—American—Barbecue—Mexican—Pizza—Cuban—French—Soul Food—Spanish
VALUE:
Cheap—Cheaper—Cheapest—Worth Every Penny
EVENTS:
Kosher—Thanksgiving—Mother's Day—Father's Day—4th of July Islands for wine products may likewise be provided with directly-related categories, such as:

RED:
Pink—Light-Bodied Red—Medium-Bodied Red—Full-Bodied Red
WHITE:
Sparkling—Light-Bodied White—Medium-Bodied White—Full-Bodied White With reference to FIG. 8, there is shown a sorting process 800 of a large number of choices 802 to a first smaller subgroup 804 to a second smaller subgroup 806 and finally to a final choice 808. This is an example of how decisions can be made in the real world. One starts with a multitude of choices, narrows them down, and then finally says "yes" to one. What is so powerful about the processes and systems of the disclosure is that they physically and electronically facilitate this human decision-making process. The three dimensional design (both in the real store and in its digital representation) literally moves customers from a multitude of choices to a manageable decision set and then gives them all of the information that a majority of people might need to make an informed, appropriate and satisfying choice for that limited set, so as to minimize the information needing to be reviewed by the consumer. And, the parsing process is based on what the consumer knows and needs rather than on an irrelevant tradition or, as is often true of the business mind-set, what the company wants to sell. The disclosure is designed to help people select and buy products in a consumer-centric approach that has heretofore not been practiced.

Figure 2:
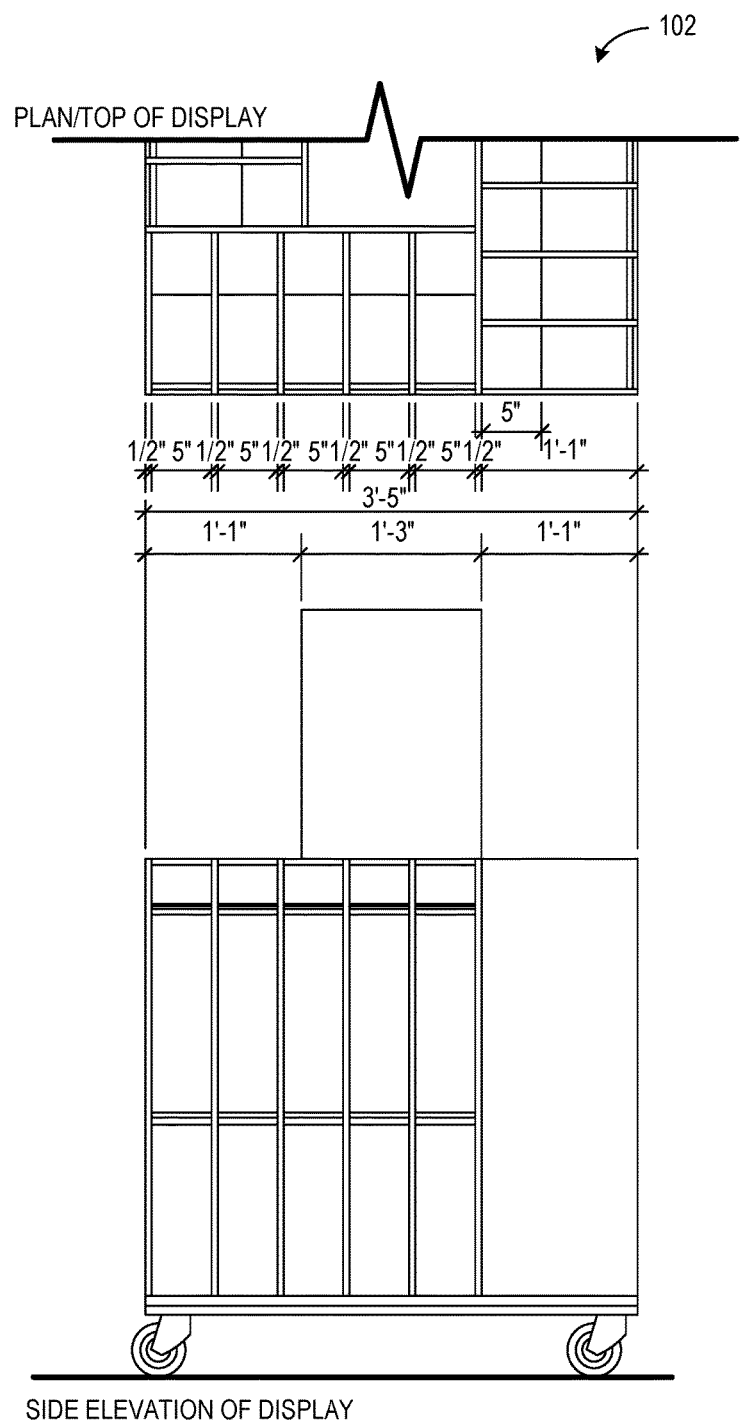
FIG. 2 is a mechanical drawing of a display shelf, or "island" in the retail store of FIG. 1.

With reference to FIG. 1, there is shown a retail store environment 100 including a plurality of islands 102, each island comprising a unique display arrangement as shown in FIG. 2. With reference to FIG. 1, the island 102 is seen to include a top level theme 104 indicating "Take-Out" food and a visual icon 106 indicating the island theme; here a noodle box 106 to indicate Asian food. One side 110 of the island 102 is seen to display wines appropriate for Chinese food, a second side 108 displays wines appropriate for Thai food. The remaining two sides can indicate wines appropriate for other sub-categories of Asian take-out food. Detailed wine information, in the form of printed materials 112, may be included with each displayed wine, as shown in FIG. 3. The described wall displaying all 365 choices is shown at 114. In FIG. 2, the top and side views of the island 100 are shown in a mechanical drawing. The display allows the thematic grouping of a relatively small number of 20 wines segregated from the larger inventory offering of 365 by an organizing principal based on the practical use of wine. By focusing, for example, on the tangential category "Take Out", the consumer has moved effortlessly from the larger selection to a more manageable subset of twenty wines to review.

Within the "Take Out" subset of wines displayed on one island 102, the consumer is then faced with a choice of even smaller groupings, for example wines that go with "Chinese," "Indian," "Japanese," and "Thai" take-out food. Each of these sub-categories is associated with five selected wines, a manageable and appropriate set of choices given the specificity of the consumer's need.

The interested consumer has just effortlessly moved from 365 choices, to twenty related to a relevant theme, to five focused on this person's unique interest. It is at this point that the consumer finds detailed information on each of the five wines, intended to give the potential buyer a wealth of relevant information in order to make an informed and personal decision. It is understood that while the present applicant believes these numbers to be optimal, they are not limiting. Rather, appropriate quantities are based upon the intended goal of assisting consumer sort large quantities of choices down to manageable groups.

Using POS software, the disclosure provides a template approach to providing wine information for customers that includes a basic description such as the price, place of origin, grape, year, etc. It also includes higher level information such as food and wine-pairing guidance, a detailed professional tasting note, ratings information from the entire industry, a retailer's own index, and general information the consumer might find interesting. This information is found everywhere in the store a wine is found. See, for example, FIG. 3 showing a graphical illustration of exemplary information available to customers proximate the wine selections.

In addition, when a consumer makes a purchase decision, the software system is integrated in the buying experience such that a copy of this information is automatically reformatted and included in the bag with the purchase. This allows the consumer the opportunity to learn about the wine at home, to retain the information resource at the point in time when it is relevant and helpful. See, for example, FIG. 4 showing a graphical illustration of exemplary information available to customers at the point-of-sale register/checkout system.

Figure 6:
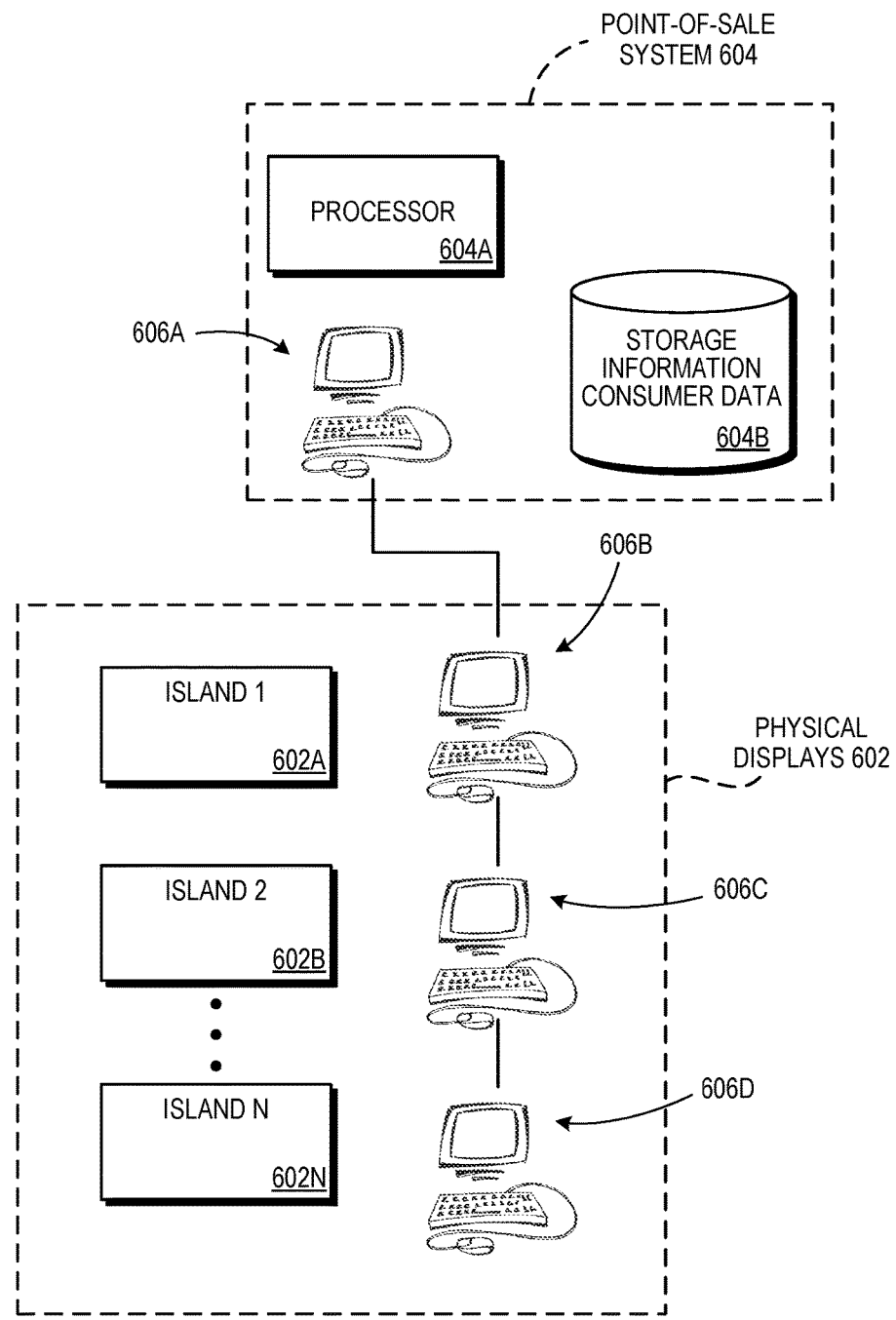
FIG. 6 is a block diagram showing the association of physical and electronic components according to the disclosure.

FIG. 6 shows a system including a retail store physical display 602 including the above described-islands 602A, 602B, 602N (as many as required) and a point of sale system 604 including a processor 604A, storage 604B containing the above described information and a series of connected displays 606A-606D in association with the POS system 604 and physical, island displays of products. The POS system may comprise one or more of conventional register/checkout systems functional to facilitate sales, cash and credit/debit card processing, receipts, inventory management, etc. conventional with such systems. Similarly one or more computer systems may be used in a conventional way to store, retrieve and/or display information as described herein. Any functions described above with respect to the POS may also be made available on a publicly-accessible computer network, such as via a website on the Internet, so that customers may search, shop and order products remotely from the retail location. In certain embodiments, the online shopping experience may present search options in a manner that resembles the process employed by a consumer to locate a wine at the physical retail location.

Figure 5:
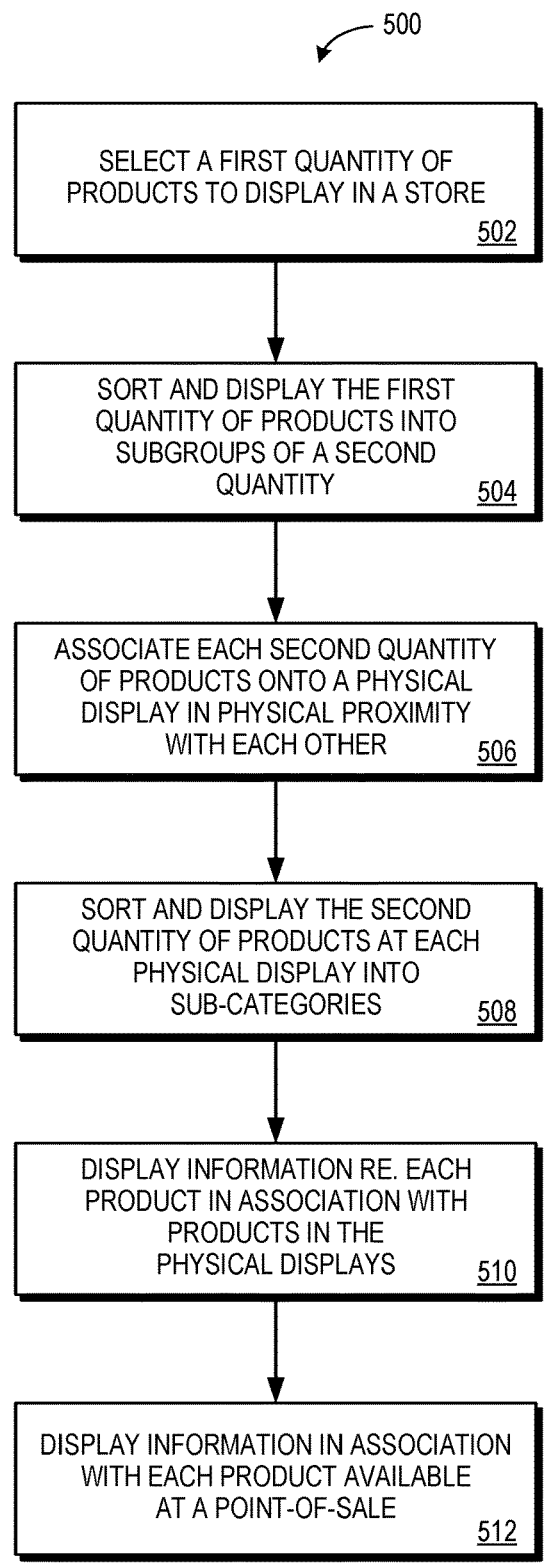
FIG. 5 is a flow chart showing a process of organizing and displaying consumer products in association with one another and with information useful to consumers.

FIG. 5 shows an exemplary process 500 for organizing and displaying products in accordance with the present disclosure. A first quantity of products is selected for display (502). Optionally, this first quantity may be displayed in its entirety, for example in one section of the store. Further in accordance with the disclosure, the first quantity is sorted into smaller groups of a second quantity based upon a sorting factor relevant to consumer choice (504). These groups are sorted into physical displays (506), each group in the display again sorted into smaller subgroups within the physical display (508). Information is displayed in association with the physical products (510) using printed information and/or electronic displays such as displays 606A-D. Further information is provided in association with selected products as they are purchased by a consumer at a point of sale (512), for example point of sale system 604 (FIG. 6), in printed and/or electronic format.

Figure 7:
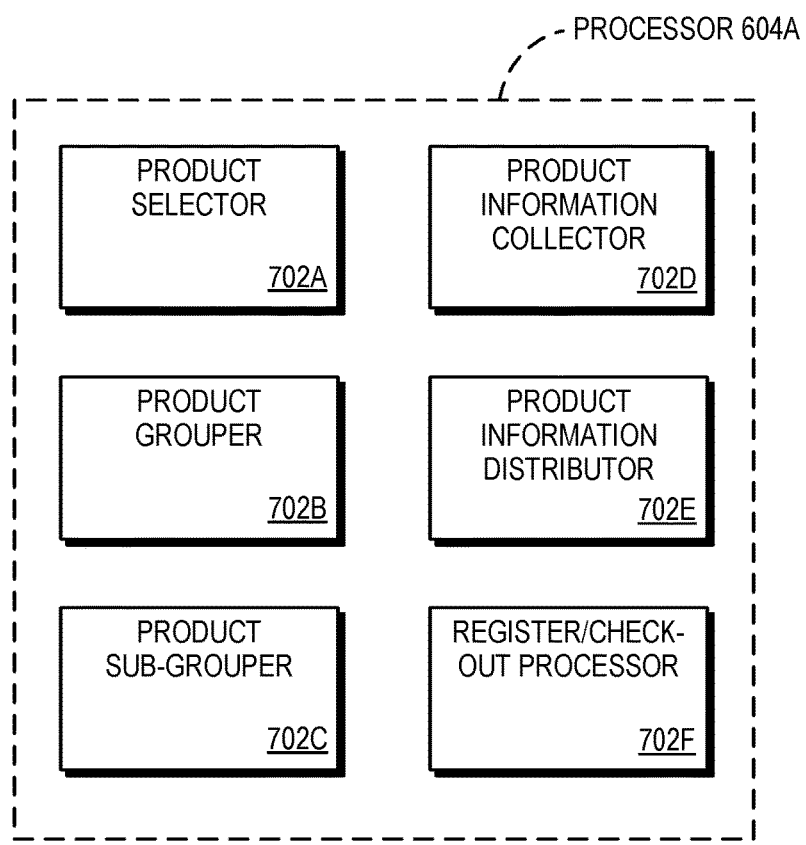
FIG. 7 is a block diagram showing the functional components of the processor of FIG. 6.

FIG. 7 shows a functional depiction of processor 604A of FIG. 6, including operational elements which may be implemented in hardware, firmware, software or a combination of the above. This implementation includes a product selector 702A for selecting an initial display quantity of products 702A. Product groupers 702B (for selecting a tangential category) and product sub-groupers 702C (for selecting sub-categories corresponding to each tangential category) determine the functional arrangement of products into islands and groups within an island as described above. A product information collector 702D collects, stores and otherwise manages product information as described above. A product information distributor 702E facilitates the display of appropriate product information in an appropriate format in association with both the physical displays/islands and the POS. A register or check-out processor 702F facilitates the actual purchase of a product by a customer.

Optional additional features of a retail establishment in accordance with the present disclosure include:
  Children's play area. Keep the little people happy while
    the big people enjoy themselves.

Dog friendly area. Tie up and treats, although pups may be encouraged to roam free.

Library, bookstore and sitting area. Wine, spirit, food and cooking periodicals and books available for sale or library with seating to make consumers comfortable and give them resources to learn.

Classes available to further education and have fun.

General events with poets, movie producers, sexologists, cooks, entrepreneurs, among others, called the "Eclectic Salon" to taste and learn about wine, hear talks on interesting topics, and connect wine to the wider experience of life.

An on-premises wine bar or lounge where various wines can be purchased and consumed.

There has thus been provided new and improved methods and systems for providing both an information-conveying layout and textual information regarding products in an online or real-world environment, such as a retail store. While the disclosure has been shown and described with respect to a wine store, it is applicable to any analogous product wherein there are multiple related choices and consumers benefit from the informative product layout and information. By providing consumers with the most user-friendly, intuitive and systematic approach to wine-buying, the present disclosure provides to customers the rare satisfaction of having made a precise and intelligent choice based on personal preference rather than flying blind or outsourcing the decision to a salesperson. By giving buyers an opportunity to incrementally increase their knowledge of wine, their confidence and competence in the subject is likewise increased. This is a new experience for most consumers and it is such a superior experience in that it represents a massive advantage over previous methods and systems for selling products such as beverages, and in this example, retail wine.

While the disclosure has been shown and described with respect to particular embodiments, it is not thus limited. Numerous modifications, changes and enhancements will be readily apparent to the reader and one of ordinary skill in the art.

What is claimed is:

1. A method for organizing varieties of a product sold to consumers, each variety of the product being associated with a plurality of direct categories for the product and a plurality of tangential categories for the product, the method comprising:

providing a product display dedicated to a single tangential category from the plurality of tangential categories, the product display for displaying a plurality of varieties of the product that are associated with the single tangential category, providing an identification of the single tangential category on the product display, the identification comprising at least one of a graphical identification and a textual identification, the identification displayed in proximity to a top portion of the product display so as to be readily viewed by a consumer in order to assist the consumer in making a selection of the product, associating the single tangential category with at least two sub-categories of the single tangential category, associating a lesser number of the varieties of the product with each of the sub-categories;

providing a plurality of sides of the product display, where each side of the product display is dedicated to only one of the at least two sub-categories, displaying an identification of the sub-categories on each of the plurality of sides so as to be readily viewed by the consumer in order to further assist the customer in making the selection of the product;

providing a plurality of slots on each side of the product display, each slot being dedicated to only one variety of the product, the one variety corresponding to the sub-category associated with that side of the product display, providing a textual identification of a direct category corresponding to the one variety of product, where the textual identification of the direct category is disposed in proximity to each slot so as to be readily viewed by the consumer in order to assist the consumer in finalizing the selection of the product.

2. The method of claim 1, wherein the product display comprises a product island within a retail establishment.

3. The method of claim 1, wherein the slots on at least one side of the product display are disposed in parallel.

4. The method of claim 3, wherein each slot holds a quantity of one variety of the product.

5. The method of claim 1, wherein the product comprises a wine.

6. The method of claim 5, wherein the at least one tangential category includes foods or events for which a suitable wine is desired by the consumer, and wherein the plurality of direct categories includes a color of the wine, a brand of the wine, a region of the wine, a country of origin of the wine and a type of wine grape.

7. The method of claim 5, wherein each slot is sized to securely hold at least one wine bottle in a horizontal orientation with respect to a floor supporting the product display, and wherein multiple wine bottles are stacked upon each other in the horizontal orientation within each slot.

8. The method of claim 1, further comprising:

providing a second product display in which the product is arranged only according to the plurality of direct categories.

9. The method of claim 1, said product display further comprising:

a plurality of physical product islands, each physical product island dedicated to only one of the plurality of tangential categories.

* * * * *